United States Patent [19]
Le Van Suu

[11] Patent Number: 6,049,071
[45] Date of Patent: Apr. 11, 2000

[54] DEVICE FOR THE POWER SUPPLY OF A NON-LINEAR LOAD, ESPECIALLY A MAGNETRON OF A MICROWAVE OVEN

[75] Inventor: Maurice Le Van Suu, Savigny le Temple, France

[73] Assignee: STMicroelectronics S.A., Gentilly, France

[21] Appl. No.: 09/204,673

[22] Filed: Dec. 3, 1998

[51] Int. Cl.[7] .................................................. H05B 6/66
[52] U.S. Cl. ........................................ 219/715; 236/78 D
[58] Field of Search .................................. 219/707, 715, 219/681, 757, 400, 703; 236/78 D; 363/37, 97; 364/492

[56] References Cited

U.S. PATENT DOCUMENTS

| | | | |
|---|---|---|---|
| 5,208,432 | 5/1993 | Han | 219/10.55 B |
| 5,272,428 | 12/1993 | Spiegel et al. | 318/803 |
| 5,381,954 | 1/1995 | Tokizaki | 236/78 D |
| 5,483,044 | 1/1996 | Thorneywork et al. | 219/681 |
| 5,483,463 | 1/1996 | Qin et al. | 364/528.32 |
| 5,552,584 | 9/1996 | Idebro | 219/707 |
| 5,621,627 | 4/1997 | Krawchuk et al. | 363/37 |
| 5,648,038 | 7/1997 | Fathi et al. | 264/406 |
| 5,704,200 | 1/1998 | Chmielewski, Jr. et al. | 56/10.2 E |
| 5,784,531 | 7/1998 | Mann et al. | 392/494 |
| 5,806,055 | 9/1998 | Zinda, Jr. | 706/45 |
| 5,821,638 | 10/1998 | Boys et al. | 307/104 |

FOREIGN PATENT DOCUMENTS

| | | | |
|---|---|---|---|
| 0 433 158 A1 | 6/1991 | European Pat. Off. | H05B 6/68 |
| 0 690 551 A1 | 1/1996 | European Pat. Off. | H02M 1/00 |
| 2 680 297 A1 | 2/1993 | France | H05B 6/68 |

OTHER PUBLICATIONS

Liu J. et al., "A New Microwave Power Source and Its Application", 1996 IEEE MTT–S International Microwave Symposium Digest, San Francisco, Jun. 17–21, 1996, vol. 1, pp. 61–63.

*Primary Examiner*—Teresa Walberg
*Assistant Examiner*—Jeffrey Pwu
*Attorney, Agent, or Firm*—Theodore E. Galanthay; Allen, Dyer, Doppelt, Milbrath & Gilchrist, P.A.

[57] ABSTRACT

A power supply device for a non-linear load, especially a magnetron for microwave ovens, includes a resonant transformer. Using a fuzzy logic management unit, a level of a low voltage signal on the primary side of the transformer, a level of high voltage signal on the secondary side of the transformer, and a signal corresponding to the ambient temperature of the transformer are taken into account for the generation of a parameter for a control signal for controlling a switch positioned at the primary winding of the transformer. The power supply device makes it possible to reduce the size of the resonant transformer.

30 Claims, 3 Drawing Sheets

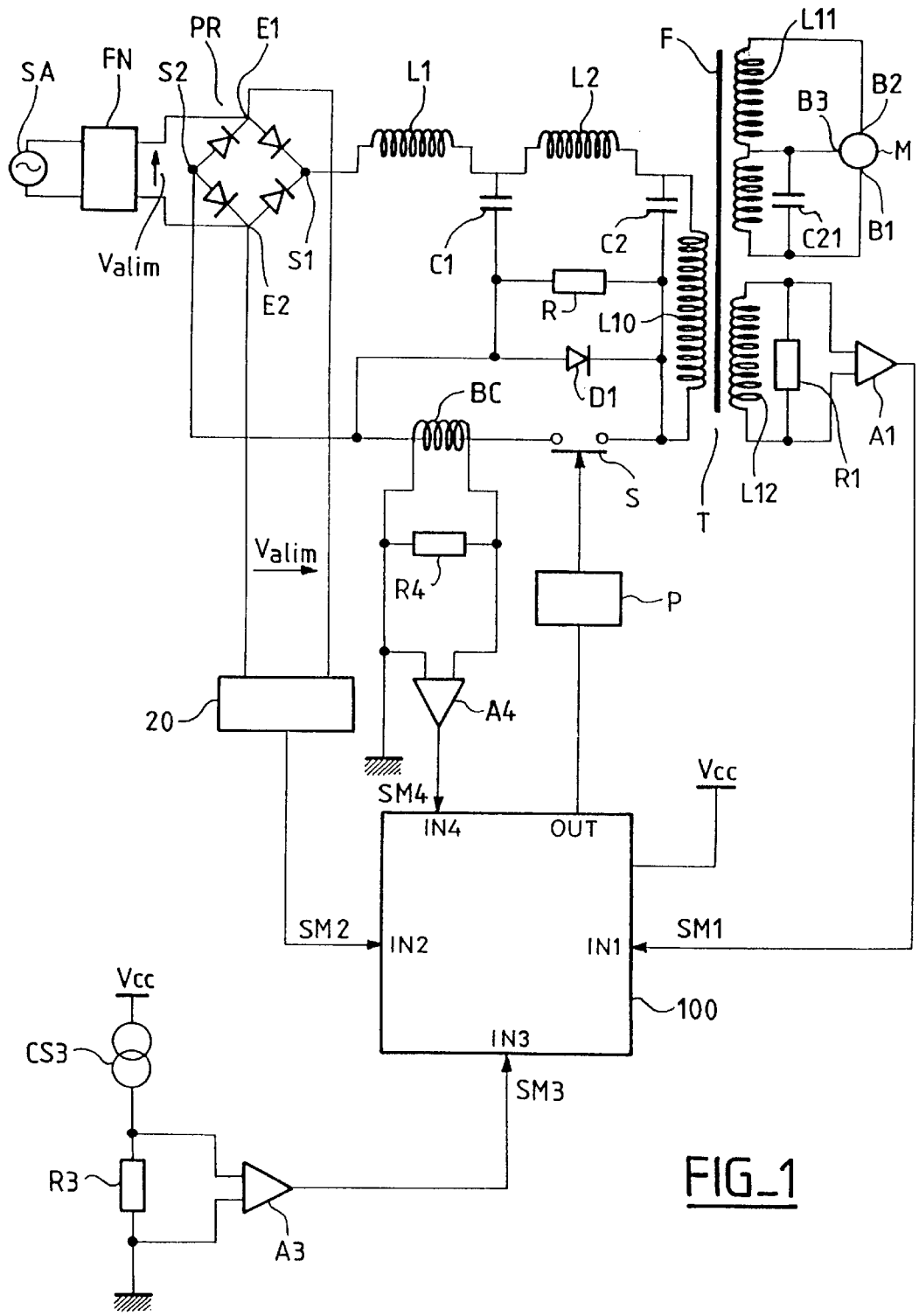
FIG_1

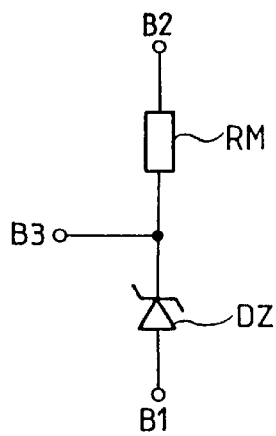
FIG_4
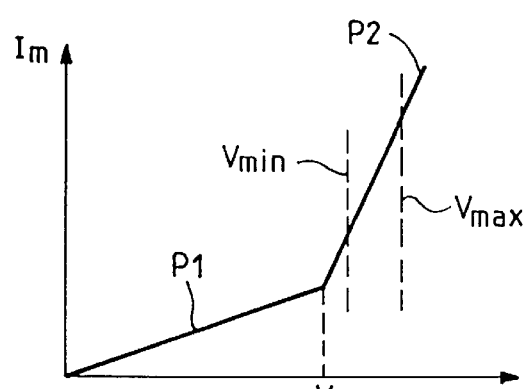
FIG_5
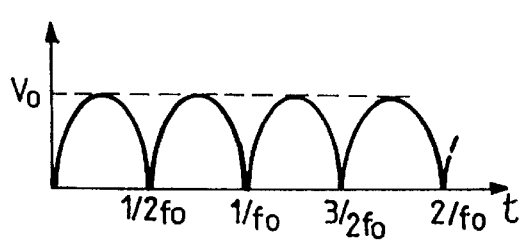
FIG_2
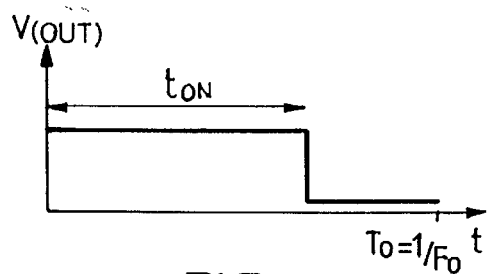
FIG_3
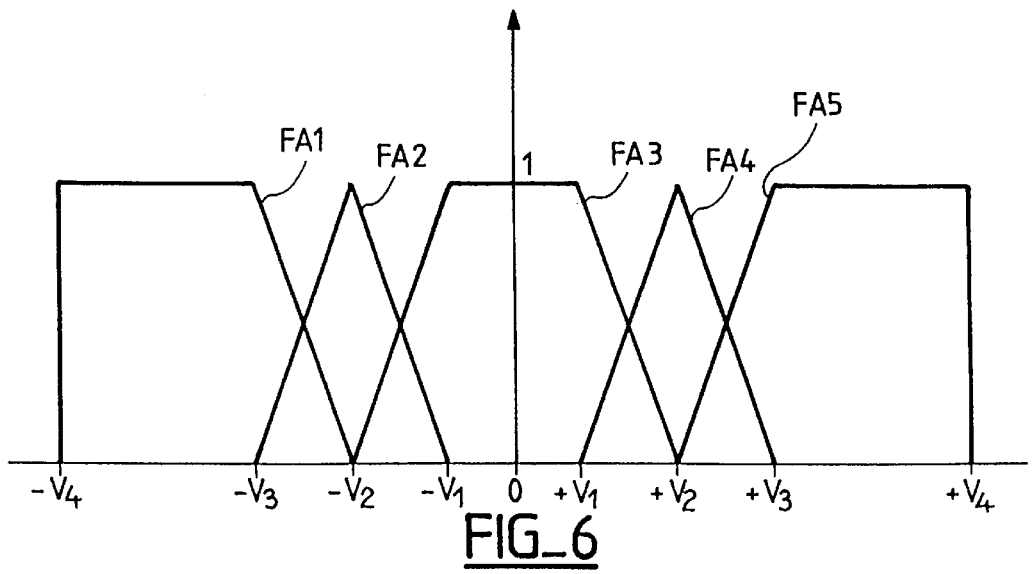
FIG_6

R11 : IF VBT=SMALL AND IF TEMP=NORMAL THEN MU=GREAT
R12 : IF VBT=GREAT AND IF TEMP=NORMAL THEN MU=SMALL
...
R21 : IF TEMP=GREAT AND IF VHT=NORMAL THEN MU=SMALL
R22 : IF TEMP=VERY GREAT AND IF VHT=NORMAL THEN MU=VERY SMALL
R23 : IF TEMP=SMALL AND IF VHT=NORMAL THEN MU=GREAT
R24 : IF TEMP=VERY SMALL AND IF VHT=NORMAL THEN MU=VERY GREAT
...
R31 : IF C=VERY GREAT AND IF VHT=NORMAL THEN MU=VERY SMALL
...
R41 : IF VHT=VERY GREAT THEN MU=VERY SMALL
...
R51 : IF TEMP=VERY SMALL AND VHT=VERY SMALL THEN MU=VERY SMALL
R52 : IF TEMP= SMALL AND IF VHT=VERY SMALL THEN MU=SMALL
R53 : IF TEMP=VERY SMALL AND VHT=SMALL THEN MU=VERY SMALL
R54 : IF TEMP= SMALL AND IF VHT=SMALL THEN MU=SMALL

FIG_7

DEVICE FOR THE POWER SUPPLY OF A NON-LINEAR LOAD, ESPECIALLY A MAGNETRON OF A MICROWAVE OVEN

FIELD OF THE INVENTION

The present invention relates to the field of power supplies, and more particularly, to a power supply for a non-linear load, such as a magnetron for a microwave oven.

BACKGROUND OF THE INVENTION

A magnetron is a transducer. When supplied with a high supply voltage of about 1000 volts, the magnetron produces electromagnetic waves radiating at very high frequency. This radiation is advantageously used to cause agitation in the molecules of a solid or a liquid substance. The magnetron is the principal device for microwave ovens, which uses the principle of thermal agitation to cook and heat food. These microwave ovens are designed particularly for domestic use. Since domestic electrical appliances are supplied with low voltage, it is necessary to provide a power supply device for the magnetron. In Europe, for example, an AC voltage has an amplitude of 220 volts at a frequency of 50 Hz.

There are known power supply devices comprising a resonant transformer having a controlled switch at the primary winding of the transformer. As a result of the controlled switch, the resonant transformer converts a low supply voltage available at the primary winding into a high supply voltage for delivery to the terminals of the load. The high supply voltage is available at the secondary winding of the transformer.

The primary winding of the transformer has filtering means with a resonant frequency equal to the excitation frequency of the transformer. The switch is controlled by a control signal. One parameter of this control signal is set to servo-control the quantity of energy transmitted to the secondary winding, i.e., the power supplied to the load. This parameter may be a frequency, a cyclical ratio or any other variable that can be controlled in a determinable way.

In normal operation, the magnetron absorbs power of about 1500 watts. The magnetron requires a high supply voltage that can vary between 800 and 1200 volts, with a typical mean value of about 1000 volts. The mean current is about 8 amperes, with excess voltages requiring a current of up to 40 A.

To reduce the size of the transformer of the power supply device, the windings of the transformer are made with copper wire. However, copper is becoming an increasingly costly material. Furthermore, the transformer is still too bulky to produce even more compact microwave ovens. However, the reduction in the size of the transformer is limited by the need to have available a mass of copper that is sufficient to dissipate the heat generated, especially as a result of the losses resulting from the saturation of the magnetic material of the transformer.

SUMMARY OF THE INVENTION

An object of the present invention is to provide a device for the power supply of a non-linear load to resolve the above-mentioned problems encountered in the prior art devices. The non-linear load includes, but is not limited to, a magnetron for microwave ovens.

A power supply device comprises means for delivering a measurement signal to measure the level of the high supply voltage, means for delivering a measurement signal to measure the level of the low supply voltage, and means for delivering a measurement signal to measure the ambient temperature of the transformer. A fuzzy logic management unit accepts the measurement signals as input variables and produces, as an output variable, the value of a parameter of a control signal for the controlled switch. The fuzzy logic management unit is driven by a fuzzy logic algorithm comprising a first set of consistency rules for enabling an increase in the parameter when the low supply voltage diminishes, and vice versa. Also included are a second set of consistency rules for enabling the parameter to be diminished when the ambient temperature increases, and vice versa.

Ambient temperature of the transformer is understood too mean the temperature of the volume of air immediately surrounding the transformer. A temperature sensor will therefore be positioned in the immediate vicinity of the transformer, and especially with respect to the magnetic material (ferrite core) of the transformer. Any rise in this temperature may be attributed to the fact that the magnetic material is saturated and is being heated. Through the invention, as soon as this rise in temperature is detected, the control of the controlled switch is modified to diminish the quantity of energy stored in the magnetic material between each cycle of energy transfer from the primary winding to the secondary winding.

It is thus possible to make a transformer that dissipates less heat, and can therefore be a small-sized transformer. Furthermore, using a fuzzy logic management unit has numerous advantages as compared with conventional servo-controlled devices. This is due to the fact that since the magnetron is a non-linear load, servo-control of the power supplied to the magnetron by a voltage control is not easy to achieve with a conventional servo-controlled supply. The servo-controlled device is used to control the high supply voltage applied to the terminals of the magnetron. Conventional servo-controlled supplies include proportional integral differential (P.I.D.) servo-control devices.

A system of management based on fuzzy logic does not need a precise modelling of the complete system comprising the device itself and its load, nor any setting for each copy of the product to take account of variations in the characteristics of the components used. Furthermore, an advantage inherent in fuzzy logic is that no subsequent variation in the operating characteristics of the device or of its load is likely to disturb its operation. For example, a subsequent variation may be due to the aging of the components. This advantage is applicable as long as the regulation is done using decision rules of a general character.

Furthermore, a particular feature of the present invention in which the fuzzy logic management unit is used combines well with the previously mentioned feature in which the ambient temperature of the transformer is taken into account. The designer no longer needs to model the behavior of the transformer under temperature when making the supply device.

According to another characteristic of the invention, the control signal for the controlled switch is a pulse-width modulated signal, and the output parameter of the fuzzy logic management unit is the value of a cyclical ratio or duty cycle of this signal. This has the advantage of simplicity inasmuch as the cyclical ratio of a pulse-width modulated signal can easily be controlled within a digital management unit, such as a fuzzy logic microprocessor.

BRIEF DESCRIPTION OF THE DRAWINGS

Other features and advantages of the invention shall appear from the following description. This description is given purely by way of an illustration with reference to the appended drawings, of which:

FIG. 1 shows an embodiment of a power supply device for a magnetron, according to the present invention;

FIG. 2 is a curve showing a low supply voltage after rectification, according to the present invention;

FIG. 3 is a curve showing a period of the control signal for the controlled switch, according to the present invention;

FIG. 4 is an equivalent electrical diagram of a magnetron in normal operation, according to the present invention;

FIG. 5 shows the shape of the characteristic current/voltage curve of a magnetron, according to the present invention;

FIG. 6 shows an example of the shape of the membership functions of the fuzzy logic variables of the management unit, according to the present invention; and FIG. 7 is a table of rules of consistency implemented by a fuzzy logic algorithm, according to the present invention.

DETAILED DESCRIPTION OF THE PREFERRED EMBODIMENTS

FIG. 1 shows an embodiment of a power supply device for a non-linear load according to the principle of the present invention. The power supply device has a transformer T operating as a resonant transformer. Hereinafter, a distinction is made between the primary winding and the secondary winding of the transformer.

At the primary winding, a low supply voltage Valim is generated from the voltage delivered by a source SA of AC supply voltage after filtering by a filtering circuit FN. The filtering circuit FN eliminates the effect of disturbances. The main or supply voltage is provided, for example, from a public electrical system.

The voltage Valim is transmitted to inputs E1 and E2 of a rectifier bridge PR comprising four diodes. A rectifier bridge of this kind can be used, as is known to those skilled in the art, for a full-wave rectification of the voltage Valim. A first output S1 of the rectifier bridge PR is connected to a first terminal of an inductor L1. The inductor L1 has a second terminal connected, firstly, to the first terminal of a second inductor L2 and, secondly, to a first electrode of a capacitor C1. The second terminal of the inductor L2 is connected, firstly, to a first electrode of a second capacitor C2 and, secondly, to a first end of the primary winding L10 of the transformer T.

The second electrodes of the capacitors C1 and C2 are respectively connected to the first and second terminals of a resistor R. The inductors L1 and L2, the capacitors C1 and C2, and the resistor R collectively operate as a resonant filter. Their values are determined as a function of the excitation frequency of the transformer to ensure the resonance of the primary circuit of the transformer.

A freewheeling diode D1 is connected in parallel to the resistor R. Its anode being connected on the capacitor C1 side and its cathode being connected on the capacitor C2 side. The anode of the diode D1 is also connected to the output S2 of the rectifier bridge PR. The second output S2 of the rectifier bridge PR is connected to the second end of the primary winding L10 of the transformer T through a controlled switch S. The successive opening and closing cycles of this switch S determine the excitation frequency of the transformer T.

At the secondary winding of the transformer T, there is a load which may be particularly, but not necessarily, a magnetron M. The magnetron M is connected by a first terminal to a first end of the secondary winding L11 of the transformer T, and by a second terminal B2 to the other end of the secondary winding L11. An intermediate node of the winding L11 is connected to a third input B3 of the magnetron M. A starting capacitor C21 is connected between the first input B1 and the third input B3 of the magnetron M. The function of the starting capacitor C21 is discussed below.

The power supply device thus described works as follows. When the power switch S is closed, the current flows through the inductors L1 and L2, and the primary winding L10 from the node S1 to the node S2. The magnetic circuit of the transformer T, comprising a magnetic material such as a ferrite core F, becomes charged with electromagnetic energy. The diode D1 is not conducting. When the controlled switch S opens, the electromagnetic energy stored in the ferrite core F is suddenly transferred into the secondary winding L11 of the transformer. A discharge current may then flow in the primary winding L10 in the direction opposite the previous one through the recovery diode D1 which is non-conducting. Therefore, the diode D1 enables a fast demagnetization of the primary winding L10 when the controlled switch S is opened.

The frequency of the opening and closing cycles of the switch S determines the quantity of energy transferred to the secondary winding L11 of the transformer T. This also determines the value of the power transmitted to the magnetron M. The frequency of the opening and closing cycles of the switch S also determines the ratio between the time for which this switch is closed and the duration of a cycle of the control signal for the switch S. The magnetron M is voltage controlled through the high supply voltage Vm applied between its first terminal B1 and its second terminal B2.

The power supply device has a management unit 100. In one embodiment, the management unit 100 is a fuzzy logic circuit, such as an SGS-THOMSON MICROELECTRONICS microcontroller WARP3. The management unit 100 is supplied with a supply voltage Vcc of 5 volts. It has at least four inputs IN1, IN3, IN2 and IN4 for receiving analog signals having amplitudes that do not exceed the supply voltage Vcc. An analog-digital converter is included in the management unit 100 immediately after each of the above-mentioned inputs. The analog-digital converter converts the received signals into digital signals that can be processed by the management unit 100.

The power supply device of FIG. 1 comprises means for measuring the high supply voltage Vm of the magnetron M. These means comprise an auxiliary winding L12 positioned at the secondary winding of the transformer T. A measurement resistor R1 is connected across the terminals of the auxiliary winding L12. The terminals of the measurement resistor R1 are also connected to the inputs of a differential amplifier A1. The differential amplifier A1 produces a measurement signal SM1 for the measurement of the high supply voltage Vm. The voltage Vm is capable of varying in a range from 800 to 1200 volts, with a mean value of 1000 volts. The ratio between the number of turns of the secondary winding L11 of the transformer T, and the number of turns of the auxiliary winding L12 is about 250. Thus, the amplitude of the measurement signal SM1 does not exceed 5 volts.

The device of FIG. 1 also has means for measuring the low supply voltage Valim. These means comprise circuit 20 whose inputs are parallel-connected to the inputs E1 and E2 of the rectifier bridge PR. For example, the level translator circuit 20 is a resistor bridge (divider bridge) in which the amplitude of the low voltage supply can be reduced to a level below the supply voltage Vcc of the management unit 100, i.e., about 5 volts. The output of the level translator circuit 20 delivers a second measurement signal SM2 providing a measurement of the low supply voltage Valim. This signal is transmitted to the second input IN2 of the management unit 100.

The device furthermore comprises means for measuring the ambient temperature. A third measurement signal SM3 is produced and is transmitted to the third input IN3 of the management unit 100. The means include a resistor R3 whose value is dependent on the temperature. This resistor R3 is series-connected with a current source CS3 between the supply voltage Vcc and ground. The resistor R3 is provided with a constant current generated by the source CS3. For example, the resistor R3 is an NTC type with a negative temperature coefficient of resistance, or of a PTC type with positive temperature coefficient of resistance. The terminals of the resistor R3 are connected to the inputs of a differential amplifier A3 whose output delivers the measurement signal SM3. The value of the resistor R3 is such that the amplitude of the measurement signal SM3 is at most equal to the supply voltage Vcc of the management unit 100, i.e., about 5 volts. According to the present invention, the term ambient temperature is the temperature in the immediate vicinity of the transformer T, and its load is formed by the magnetron M.

The power supply device may also, but not necessarily, comprise means for measuring the current flowing through the controlled switch S. The means comprises an ammeter pair. The ammeter pair comprises a current loop BC wound about the arm of the circuit having the controlled switch S. The ends of this loop are connected to the terminals of a measurement resistor R4. A current proportional to the current flowing in the arm is induced in the current loop BC, and generates a potential difference at the terminals of the resistor R4. The terminals of the resistor R4 are also connected across the input terminals of a differential amplifier A4. The differential amplifier A4 delivers a measurement signal SM4 to measure the current flowing in the controlled switch S. The signal SM4 is provided at the fourth input IN4 of the management unit 100. One of the two input terminals of the differential amplifier A4 is connected to ground. The terminal connected to ground is dependent upon the direction of the winding of the current loop BC. The value of the resistor R4 is determined so that the amplitude of the measurement signal SM4 is at most equal to the supply voltage of the management unit 100, i.e., about 5 volts.

The controlled switch S is preferably a power MOS transistor. The control signal applied to the control gate of this transistor for determining whether the power MOS transistor is on or off is generated by an output OUT of the management unit 100. In other words, the control signal determines whether the controlled switch is in a closed or open state. When this signal is in the logic 1 state, the MOS transistor is on. When this signal is in the logic 0 state, the MOS transistor is off.

The control signal is transmitted to the gate of the MOS transistor by a power circuit P. The power circuit provides current sufficient for the speedy charging of the gate capacitor of the transistor when the control signal goes to a logic 1 value. The power circuit P also keeps the gate capacitor charged as long as the switch must remain in a closed state.

Likewise, the power circuit P brings about the speedy discharging of the gate capacitor when the c-ontrol signal goes to a logic 0 value. The power circuit P therefore has the function of ensuring a speedy switch-over of the power MOS transistor from the on state to the off state, and vice versa. A circuit of this kind is known to one skilled in the art, and will not be described herein.

The principle of operation of a power supply device using the resonant transformer illustrated in FIG. 1 will be understood more clearly in the light of the following explanations with reference to FIGS. 2 and 3. Referring to FIG. 2, a curve is shown which depicts the shape of the low supply voltage available between the terminals of the outputs S1 and S2 of the rectifier bridge PR. This shape represents the voltage Valim whose two half-waves have been rectified. The signal shown in FIG. 2 is a periodic signal with a period $1/(2 \times f0)$, where f0 is the frequency of the low supply voltage Valim. In Europe, the low supply voltage delivered by the main voltage has a frequency f0 equal to 50 Hz.

To limit the size of the transformer T, the switching of the controlled switch S is activated at a frequency F0 of excitation of the transformer, whose value is very high as compared with the frequency f0 of the low supply voltage. In one example, this frequency F0 of the control signal for the controlled switch S is about 70 kHz.

Preferably, the control signal for the controlled switch S generated by the management unit 100 at its output OUT is a pulse-width modulated periodic signal, as illustrated in FIG. 3. This signal is at a logic 1 state during a part tON of its period T0, where T0=1/F0. For the duration tON, the controlled switch S is closed and, for the rest of the period, it is open. A parameter of the control signal for the controlled switch S is determined by the duty cycle or cyclical ratio $\mu$ of the control signal V(OUT) delivered by the output OUT of the management unit 100. This cyclical ratio $\mu$ is determined by the ratio of the time for which the switch is closed to the total duration of a period. In other words, $\mu$ is such that $\mu = tON/T0$.

To account for the development of the amplitude of the rectified voltage available between the outputs S1 and S2 of the rectifier bridge PR, the cyclical ratio $\mu$ of the control signal for the controlled switch S must be permanently adapted so that the value of the high supply voltage Vm delivered to the secondary winding of the transformer T is kept constant. The rectified voltage available between the outputs S1 and S2 varies, as illustrated by the curve in FIG. 2.

The parameter of the control signal for the controlled switch S formed by the cyclical ratio $\mu$ determines the value of the high supply voltage Vm delivered to the terminals of the secondary winding L11. The high supply voltage Vm is then applied between the terminals B1 and B2 of the magnetron M. The difficulty of the servo-control of the high supply voltage Vm using this parameter lies in the fact that neither the load of the power MOS transistor nor the load beyond the transformer T shows linear characteristics. The load of the power MOS transistor is formed by the transformer T. The load beyond the power MOS transistor is formed by the magnetron M.

FIG. 4, for example, shows an equivalent diagram of the magnetron M in normal operation. The equivalent diagram is a simplified electrical diagram of a magnetron which may form a satisfactory model of the magnetron M in normal operation. This equivalent diagram has a resistor RM connected between the second and third terminals of the magnetron, B2 and B3 respectively. Also connected is a zener diode DZ by its cathode to the third terminal B3, and by its anode to the first terminal B1 of the magnetron. In other words, the magnetron in normal mode is equivalent to a zener diode DZ connected by its cathode to a resistor RM, series-connected between its first input terminal and its second input terminal, B1 and B2 respectively. The input terminal B3 is formed by the node common to these two components.

FIG. 5 shows the shape of the current/voltage characteristic curve of the magnetron M in normal operation. The X-axis shows the voltage Vm which is the high supply voltage of the magnetron M. The Y-axis shows the current Im flowing between the input terminals B1 and B2 of the magnetron M. The characteristic curve has a first portion P1 for the low values of the voltage Vm, with a first positive slope. For voltages Vm greater than a threshold voltage VZ, the characteristic curve has a second portion P2 having a second positive slope greater than that of the first portion P1. The threshold voltage VZ is equal to the threshold voltage of the zener diode DZ of the equivalent diagram of FIG. 4.

The starting capacitor C21 connected between the terminals B1 and B3 of the magnetron reduces the impedance between these terminals for the low values of the voltage Vm, i.e., when the system is started up. It will be noted that, in normal operating mode, the high supply voltage Vm must be kept between two boundary values, Vmin and Vmax, so that the magnetron M emits microwaves. It is within this range of variation that the servo-control of the voltage Vm must account for firstly, the progress of the level of the low supply voltage Valim and, secondly, the ambient temperature of the transformer. This servo-control is done according to the invention using a fuzzy logic algorithm, as described below.

The management unit 100, which is also referred to as a fuzzy logic microcontroller, accepts input variables which are at least three in number. These include the variable VHT, which is the level of the high supply voltage Vm delivered to the secondary winding of the transformer T. Another variable is VBT, which is the low supply voltage Valim available at the primary winding of the transformer T. A third is the variable TEMP, which is the ambient temperature of the transformer.

Other input variables may also be taken into account in the fuzzy logic algorithm. In particular, a variable is used for protecting the power supply device against certain types of malfunctions. In particular, one embodiment of the invention that shall be described further below takes account of the current flowing through the controlled switch S to limit this current if necessary to protect the power MOS transistor forming the controlled switch S. The management unit 100 then also accepts a corresponding input variable C.

Each of these input variables is an analog variable inasmuch as it provided by one of the measurement signals SM1, SM2 or SM3, and possibly SM4 for the variable C. These signals are transmitted on one of the respective inputs IN1, IN2 and IN3, and possibly IN4 for the signal SM4 corresponding to the variable C of the microcontroller 100. The value of these analog signals is converted into a digital value by the analog-digital converter of each input IN1 to IN4, so that the digital value of the corresponding variable is processed in the management unit 100.

The management unit 100 also delivers an output variable Mu which, according to the invention, corresponds to a parameter of the control signal of the controlled switch S. Thus, this parameter is preferably the cyclical ratio $\mu$ of the control signal, which is a pulse-width modulated signal. The value of the output variable MU is determined as a function of the value of the input variables according to the fuzzy logic algorithm implemented in the management unit 100.

For each of the input variables and for the output variable, a specified number of membership functions is defined in a memory within the management unit 100. In one example, there are five membership functions for each variable. This number is sufficient to enable efficient management of the power supply device without creating any need for storage capacity within the management unit 100, or for any excessive complexity of the algorithm, including excessive processing time.

FIG. 6 shows a possible shape of five membership functions FA1 to FA5 covering the totality of the dynamic range of the variables considered. For the fuzzy variable considered, the membership functions FA1 to FA5 define the value of a coefficient. The coefficient characterizes the likelihood of membership of this variable in a set of values (called a fuzzy set) defined on an approximate basis by a fuzzy value of the type "VERY SMALL", "SMALL", "NORMAL", "GREAT", and "VERY GREAT", respectively.

In FIG. 6, the dynamic range of variation has been centered on the mean value of the variable which, in the figure, coincides with the starting point of the axes. Furthermore, the value of the likelihood coefficients has been normalized to 1. For each variable, five membership functions are counted. The first membership function FA1 defines a set of values for which the variable is assigned the fuzzy value "VERY SMALL". This function is flat and is equal to unity between the value −V4 and the value −V3. The function then decreases linearly from this value to become canceled at the value −V2. A second membership function FA2 defines a set of values for which the variable is assigned the fuzzy value "SMALL". This function grows linearly from 0 to the value −V3 to reach unity at the value −V2. Beyond −V2, the function decreases linearly to become canceled again at the value −V1.

A third membership function FA3 defines a set of values for which the variable is assigned the fuzzy value "NORMAL". This function, starting from 0, increases linearly up to the value −V2 to reach unity at the value −V1. The function is then constant, and is equal to unity between the value −V1 and the symmetrical value +V1. Beyond +V1, the function decreases linearly to become cancelled again at the value +V2. A fourth membership function FA4 defines a set of values for which the variable is assigned the fuzzy value "GREAT". This function, starting from 0, increases linearly to the value +V1 to reach unity at the value +V2. Beyond +V2, the function decreases linearly and becomes cancelled again at the value +V3. Finally, a fifth membership function FA5 defines a set of values for which the variable is assigned the fuzzy value "VERY GREAT". This function, starting from 0, increases linearly to the value +V2 to reach unity at the value +V3, beyond which it remains constant.

The functions FA5 and FA4 are respectively symmetrical with the functions FA1 and FA2 in relation to the Y-axis, while the function FA3 is itself symmetrical with respect to the Y-axis. However, this is only one example, and one skilled in the art will realize that the membership functions may have any shape. In particular, Gaussian curves (bell-shaped curves) may provide a better definition for the fuzzy sets than curves comprising straight line segments, i.e., curves formed by jagged lines. The advantage of the shape of the membership functions shown in FIG. 6 lies in the fact that these functions can be stored in the memory of the microcontroller 100 by the storage of the outstanding values V1, V2, V3 and V4 defined in the limits of the fuzzy sets. This requires little memory space.

Furthermore, for each variable of the physical system, these outstanding values of the membership functions may be determined by automatic generation software. One such automatic generation software for the development of fuzzy logic systems is AFM & FUZZYSTUDIO, provided by SGS-THOMSON MICROELECTRONICS. This automatic generation is achieved after the machine, in this case a microwave oven, has been fully assembled. This procedure provides an advantage because, firstly, it is not necessary to set up a model of a system that is non-linear by definition to devise and perfect its management unit. Secondly, it is not necessary to take account of the variations in the characteristics of the components used for its manufacture.

For illustrative purposes only, an order of magnitude is given below for the dynamic range of variation of the physical variables corresponding to the input variables of the management unit 100. The high supply voltage (variable VHT) varies between 800 and 1200 volts with a mean value of 1000 volts. The low supply voltage (variable VBT) varies between −230 and +230 volts. The ambient temperature of the transformer (variable TEMP) varies between 10° and 90° Celsius (° C.) with a normal temperature in the range of 40° Celsius.

Furthermore, the output variable, which is the value of the cyclical ratio $\mu$ of the control signal of the controlled switch S, varies between 0.2 and 0.8 with a mean value equal to 0.5. With an eight-bit microcontroller, the dynamic range of variation of each variable is subdivided into 256 different numerical values. A numerical value of an input signal of the microcontroller may belong to several membership functions, e.g., a maximum of two with the curves given as examples in FIG. 6. With each specified numerical value of a variable, there is associated a coefficient of likelihood of membership of this value in each of the fuzzy sets defined by the membership functions associated with this variable. It is known that for each specified value of a variable, the sum of the likelihood coefficients is equal to 1.

The output OUT of the microcontroller 100 delivers a pulse-width modulated periodic signal whose cyclical ratio is determined by the fuzzy logic algorithm implemented by the management unit 100. As is known to those skilled in the art, an algorithm of this kind is based upon the verification of a certain number of rules, known as rules of consistency, which link the output variables to the input variables. Each rule establishes a decision on the fuzzy value of the output variable on the basis of the fuzzy value of one or more of the input variables, with a logic syntax of the following type:

IF <E1> and if <E2> THEN <E3>

E1 and E2 are expressions which, as the case may be, note the fact that an input variable has a given fuzzy value, e.g., SMALL or GREAT. E3 is an expression giving the output variable, in this case the cyclical ratio $\mu$, a certain fuzzy logic value.

In the fuzzy logic algorithm, the rules of consistency are successively verified with the fuzzy values of the input variables and their associated likelihood coefficients. This is done to determine a fuzzy value of the output variable with a likelihood coefficient that may be the arithmetic mean or the minimum of the likelihood coefficients. This is dependent upon whether the method used is the mean method or the minimum method. Finally, the numerical value of the output variable is determined as the sum of the numerical values corresponding to each fuzzy value weighted by the likelihood coefficient or coefficients that were associated with it as a function of the rules of consistency.

The management unit 100 generates from the digital value of the output variable a pulse-width modulated periodic signal with the cyclical ratio. In this case, the digital value is from the cyclical ratio of the control signal. With three input variables for each of which five membership functions defined (five fuzzy sets of values), it is theoretically possible to write 125 different rules of consistency. Since certain rules have such a low probability of being verified, it is possible not to take them into account. This means that the memory of the management unit 100 in which these rules are stored can be reduced accordingly. Furthermore, since the number of computations to be made is thus reduced, the fuzzy logic algorithm operates faster.

According to the invention, the management unit 100 takes into account a measurement of the high supply voltage VM, and a measurement of the low supply voltage Valim to define the cyclical ratio $\mu$ of the control signal of the controlled switch S. The algorithm comprises a set of rules of consistency, such as the rules R11 and R12 which can be seen in the table of rules shown in FIG. 7. The function of these rules is to modify the parameter $\mu$ as a function of the progress of the level of the low supply voltage Valim, at constant ambient temperature. More particularly, the modification of the parameter $\mu$ is a variation in reverse of the variation of the low supply voltage Valim. This means that the parameter $\mu$ is increased when the voltage Valim diminishes, and vice versa.

The normal value of the cyclical ratio $\mu$ is such that the transformer provides the secondary winding with a high supply voltage VM that is necessary and sufficient for the magnetron to work at the required power, e.g., in the range of 1500 watts. Furthermore, according to the invention, the management unit 100 also takes account of a measurement of the ambient temperature of the transformer T to define the cyclical ratio $\mu$ of the control signal of the controlled switch S.

The algorithm comprises another set of rules of consistency R21 to R24 that can be seen in the table of rules shown in FIG. 7. The function of these rules is to modify the parameter $\mu$ as a function of the progress of the ambient temperature. More specifically, the modification includes diminishing the value of the parameter $\mu$ when (for a specified value of the high supply voltage Vm) the ambient temperature of the transformer increases, and vice versa. An increase in the ambient temperature of the transformer implies a saturation of its magnetic core F.

Since the normal temperature of the transformer transfers the maximum energy possible from the primary winding to the secondary winding without there being any saturation of the magnetic material, the transformer works with the most efficient output possible. Consequently, it may be designed with the smallest dimensions compatible with the other physical characteristics of the device.

As a result of the fuzzy logic algorithm being implemented by the management unit 100, it is possible to keep the power supply device in conditions of operation close to normal. Such as conditions where the power delivered to the magnetron corresponds to its rated power despite the variations in the low supply voltage Valim, and where the temperature of the transformer implies an operation with optimized efficiency.

It is also possible to take advantage of the fuzzy logic to protect the supply device of the magnetron from certain types of malfunctions. In particular, the algorithm may advantageously, but not necessarily, comprise a third set of rules of consistency comprising, in particular, the rule R31 which can be seen in the table of rules of FIG. 7. The function of these rules is to modify the parameter $\mu$ as a function of the amount of the current flowing through the controlled switch S to protect the MOS transistor. In particular, the modification consists in diminishing the value of the parameter μ when the value of this current reaches a level capable of damaging the controlled switch S.

The fuzzy logic algorithm may also comprise a fourth set of rules of consistency. In particular, the rule R41, as shown in the table of FIG. 7, whose function is to reduce the parameter μ when the high supply voltage Vm is very high. This implies an over voltage capable of damaging the magnetron M.

It is also possible to take advantage of the system of management by a fuzzy logic algorithm to provide for a gradual starting up of the operation of the magnetron M. For low temperatures, such as those that could exist when the device is started up, the magnetron does not operate like the equivalent circuit discussed above with reference to FIGS. 4 and 5, but operates like a short-circuit. It is necessary to wait for the temperature of the magnetron M to rise a little before suppling it with a high supply voltage having a value equal to the value in normal operation, i.e., about 1000 volts. This means that there should be no immediate application of the value of the parameter of the control signal needed to reach a high supply voltage Vm required to supply the magnetron with the power that it needs. On the contrary, this parameter should be kept at a lower level.

The algorithm may advantageously, but not necessarily, include a fifth set of rules such as the rules R51 to R54 that can be seen in the table of rules of FIG. 7. The function of this fifth set of rules maintains the value of the parameter at a low value when the magnetron is started up if the ambient temperature is below a value considered to be normal for a steady operating mode, i.e., the normal operation of the magnetron. The function of this fifth set of rules is to maintain this value despite the fact that the high supply voltage Vm is below the normal value.

That which is claimed is:

1. A power supply device for a non-linear load comprising:
    a resonant transformer comprising a primary winding and a secondary winding;
    a controlled switch connected between a low supply voltage and the primary winding for controlling a high supply voltage at the secondary winding;
    high voltage measurement means for providing a measurement signal corresponding to a level of the high supply voltage;
    low voltage measurement means for providing a measurement signal corresponding to a level of the low supply voltage;
    temperature measurement means for providing an ambient temperature measurement signal corresponding to an ambient temperature of said resonant transformer; and
    a fuzzy logic management unit comprising
        a plurality of inputs for receiving the high supply voltage measurement signal, the low supply voltage measurement signal, and the ambient temperature measurement signal as input variables, and an output for providing as an output variable a value of a control signal parameter for controlling said controlled switch based upon a fuzzy logic algorithm comprising a first set of rules of consistency for enabling an increase in the control signal parameter when the low supply voltage decreases and for enabling a decrease in the control signal parameter when the low supply voltage increases, and a second set of rules of consistency for enabling the control signal parameter to be reduced when the ambient temperature increases, and for enabling the control signal parameter to be increased when the ambient temperature decreases.

2. A power supply device according to claim 1, wherein the control signal for said controlled switch comprises a pulse-width modulated signal; and wherein the output variable of said fuzzy logic unit is in accordance with a duty cycle of the control signal.

3. A power supply device according to claim 2, wherein the control signal parameter comprises a ratio of a time said controlled switch is on to a total duration of a period.

4. A power supply device according to claim 1, further comprising current measurement means for providing a measurement signal corresponding to a level of a current conducting through said controlled switch; and wherein said fuzzy logic algorithm further comprises a third set of rules of consistency for enabling the value of the control signal parameter to be reduced when the level of the current reaches a predetermined value capable of damaging said controlled switch.

5. A power supply device according to claim 1, wherein said fuzzy logic algorithm further comprises a fourth set of rules of consistency for reducing the control signal parameter when the high supply voltage reaches a predetermined level capable of damaging the non-linear load.

6. A power supply device according to claim 1, wherein said fuzzy logic algorithm further comprises a fifth set of rules of consistency for enabling the value of the control signal parameter to be maintained at a low value when the non-linear load is initially powered on if the ambient temperature is lower than a predetermined value corresponding to a temperature for a normal steady mode of operation.

7. A power supply device according to claim 1, wherein said fuzzy logic management unit comprises a fuzzy logic microcontroller comprising a memory for storing the first and second rules of consistency and membership functions implemented by the fuzzy logic algorithm.

8. A power supply device according to claim 1, wherein the non-linear load comprises a magnetron.

9. A power supply device according to claim 1, wherein said high voltage measurement means comprises:
    an auxiliary winding positioned adjacent the secondary winding of said resonant transformer;
    a resistor connected across the auxiliary winding; and
    a differential amplifier having inputs connected across said resistor.

10. A power supply device according to claim 1, wherein said low voltage measurement means comprises a level translator circuit having inputs parallel connected across the low voltage supply.

11. A power supply device according to claim 10, wherein said level translator circuit comprises a resistor bridge.

12. A power supply device according to claim 1, wherein said temperature measurement means comprises:
    a current source;
    a temperature sensing resistor connected in series with said current source; and
    a differential amplifier having inputs connected across said temperature sensing resistor.

13. A power supply device according to claim 4, wherein said current measurement means comprises an ammeter, said ammeter comprising
    a current sensing loop wound about a circuit path conducting current to said controlled switch,
    a resistor connected across said current sensing loop, and
    a differential amplifier having inputs connected across said resistor.

14. A power supply device for a non-linear load comprising:
- a resonant transformer comprising a primary winding and a secondary winding;
- a controlled switch connected between a low supply voltage and the primary winding for controlling a high supply voltage at the secondary winding;
- a high voltage sensor for providing a measurement signal corresponding to a level of the high supply voltage;
- a low voltage sensor for providing a measurement signal corresponding to a level of the low supply voltage;
- a temperature measurement sensor for providing an ambient temperature measurement signal corresponding to an ambient temperature of said resonant transformer; and
- a fuzzy logic management unit comprising a plurality of inputs for receiving the high supply voltage measurement signal, the low supply voltage measurement signal, and the ambient temperature measurement signal as input variables, and an output for providing as an output variable a value of a control signal parameter for controlling said controlled switch based upon a fuzzy logic algorithm.

15. A power supply device according to claim 14, wherein the fuzzy logic algorithm comprises:
- a first set of rules of consistency for enabling an increase in the control signal parameter when the low supply voltage decreases and for enabling a decrease in the control signal parameter when the low supply voltage increases; and
- a second set of rules of consistency for enabling the control signal parameter to be reduced when the ambient temperature increases, and for enabling the control signal parameter to be increased when the ambient temperature decreases.

16. A power supply device according to claim 14, wherein the control signal for said controlled switch comprises a pulse-width modulated signal; and wherein the output variable of said fuzzy logic unit is in accordance with a duty cycle of the control signal.

17. A power supply device according to claim 16, wherein the control signal parameter comprises a ratio of a time said controlled switch is on to a total duration of a period.

18. A power supply device according to claim 15, wherein said fuzzy logic management unit comprises a fuzzy logic microcontroller comprising a memory for storing the first and second rules of consistency and membership functions implemented by the fuzzy logic algorithm.

19. A power supply device according to claim 14, wherein the non-linear load comprises a magnetron.

20. A microwave oven comprising:
- a magnetron; and
- a power supply, said power supply comprising
  - a resonant transformer comprising a primary winding and a secondary winding, said magnetron connected to the secondary winding,
  - a controlled switch connected between a low supply voltage and the primary winding for controlling a high supply voltage at the secondary winding,
  - a high voltage sensor for providing a measurement signal corresponding to a level of the high supply voltage,
  - a low voltage sensor for providing a measurement signal corresponding to a level of the low supply voltage,
  - a temperature measurement sensor for providing an ambient temperature measurement signal corresponding to an ambient temperature of said resonant transformer, and
  - a fuzzy logic management unit comprising a plurality of inputs for receiving the high supply voltage measurement signal, the low supply voltage measurement signal, and the ambient temperature measurement signal as input variables, and an output for providing as an output variable a value of a control signal parameter for controlling said controlled switch based upon a fuzzy logic algorithm.

21. A power supply device according to claim 20, wherein the fuzzy logic algorithm comprises:
- a first set of rules of consistency for enabling an increase in the control signal parameter when the low supply voltage decreases and for enabling a decrease in the control signal parameter when the low supply voltage increases; and
- a second set of rules of consistency for enabling the control signal parameter to be reduced when the ambient temperature increases, and for enabling the control signal parameter to be increased when the ambient temperature decreases.

22. A power supply device according to claim 20, wherein the control signal for said controlled switch comprises a pulse-width modulated signal; and wherein the output variable of said fuzzy logic unit is in accordance with a duty cycle of the control signal.

23. A power supply device according to claim 22, wherein the control signal parameter comprises a ratio of a time said controlled switch is on to a total duration of a period.

24. A power supply device according to claim 21, wherein said fuzzy logic management unit comprises a fuzzy logic microcontroller comprising a memory for storing the first and second rules of consistency and membership functions implemented by the fuzzy logic algorithm.

25. A power supply device according to claim 20, wherein the high supply voltage varies over a range of about 800 volts to about 1200 volts.

26. A method for providing power to a non-linear load, the method comprising the steps of:
- providing a low supply voltage;
- receiving at a primary winding of a resonant transformer the low supply voltage and converting the low supply voltage into a high supply voltage present at a secondary winding of the resonant transformer, the non-linear load being connected to the secondary winding;
- controlling a transfer of electromagnetic energy from the primary winding to the secondary winding with a controlled switch connected between a low supply voltage source and the primary winding of the resonant transformer;
- generating a measurement signal corresponding to a level of the high supply voltage;
- generating a measurement signal corresponding to a level of the low supply voltage;
- generating a measurement signal corresponding to an ambient temperature of the resonant transformer;

receiving as input variables the high supply voltage measurement signal, the low supply voltage measurement signal, and the ambient temperature measurement signal;

providing as an output variable a value of a control signal parameter of a control signal for controlling the controlled switch; and generating the control signal parameter responsive to the received measurement signals.

27. A method according to claim 26, wherein the step of generating the control signal parameter comprises the steps of:

operating a first set of rules of consistency for enabling an increase in the control signal parameter when the low supply voltage decreases and for enabling a decrease in the control signal parameter when the low supply voltage increases; and operating a second set of rules of consistency for enabling the control signal parameter to be reduced when the ambient temperature increases, and for enabling the control signal parameter to be increased when the ambient temperature decreases.

28. A method according to claim 26, wherein the control signal for the controlled switch comprises a pulse-width modulated signal; and wherein the step of providing the output variable is provided in accordance with a duty cycle of the control signal.

29. A method according to claim 28, wherein the control signal parameter comprises a ratio of a time when the controlled switch is on to a total duration of a period.

30. A method according to claim 26, wherein the step of generating the control signal parameter is performed using a fuzzy logic algorithm.

* * * * *

UNITED STATES PATENT AND TRADEMARK OFFICE
CERTIFICATE OF CORRECTION

PATENT NO.    : 6,049,071
DATED         : April 11, 2000
INVENTOR(S)   : Maurice Le Van Suu It is certified that error appears in the above-identified patent and that said Letters Patent is hereby corrected as shown below:

Foreign Application Priority Data [30]    Insert --December 5, 1997 [FR] France 97 15427--

Column 2:
Line 14, Strike: "too" Insert --to--.

Column 5:
Line 65, Strike: "c-ontrol" Insert --control--

Column 7:
Line 49, Strike: "much as it provided" Insert --much as it is provided--

Signed and Sealed this

Nineteenth Day of June, 2001

Attest:

NICHOLAS P. GODICI
Attesting Officer    Acting Director of the United States Patent and Trademark Office